(12) United States Patent
Sumser et al.

(10) Patent No.: US 6,634,174 B2
(45) Date of Patent: Oct. 21, 2003

(54) EXHAUST GAS TURBOCHARGER FOR AN INTERNAL COMBUSTION ENGINE AND A CORRESPONDING METHOD

(75) Inventors: Siegfried Sumser, Stuttgart (DE); Peter Fledersbacher, Stuttgart (DE); Friedrich Wirbeleit, Esslingen (DE); Juergen Willand, Stuttgart (DE); Hans-Georg Lehmann, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/972,534

(22) Filed: Oct. 5, 2001

(65) Prior Publication Data

US 2002/0116926 A1 Aug. 29, 2002

(30) Foreign Application Priority Data

Oct. 5, 2000 (DE) .......................... 100 49 198

(51) Int. Cl.$^7$ ................................................ F02B 33/44
(52) U.S. Cl. .......................................... 60/611; 60/602
(58) Field of Search ........................ 60/611, 605.2, 60/600–603; 415/116, 151, 157

(56) References Cited

U.S. PATENT DOCUMENTS 3,049,865 A * 8/1962 Drayer ...................... 60/611
4,693,085 A * 9/1987 Sumser ....................... 60/611
5,560,208 A * 10/1996 Halimi et al. ................ 60/611
6,079,211 A * 6/2000 Woollenweber et al. ...... 60/602
6,378,307 B1 * 4/2002 Fledersbacher et al. ....... 60/611
2002/0100279 A1 * 8/2002 Mulloy et al. ................ 60/611

FOREIGN PATENT DOCUMENTS

| DE | 42 13 047 | 10/1993 | |
| DE | 196 44 892 | 4/1998 | |
| DE | 198 23 274 | 10/1999 | |
| EP | 0 196 967 | 10/1986 | |
| JP | 354042529 A1 * | 4/1979 | .................. 60/611 |

* cited by examiner

Primary Examiner—Thomas Denion
Assistant Examiner—Thai-Ba Trieu
(74) Attorney, Agent, or Firm—Kenyon & Kenyon

(57) ABSTRACT

An exhaust gas turbocharger for an internal combustion engine includes an exhaust gas turbine in the exhaust gas system and a compressor in the intake system for producing compressed charge air. A compressor rotor is arranged in a compressor inlet channel. In order to achieve a greater range of utilization, an adjustable shutoff element is arranged in the compressor inlet channel, upstream from the compressor rotor, for variable adjustment of the effective cross-section.

14 Claims, 4 Drawing Sheets

EXHAUST GAS TURBOCHARGER FOR AN INTERNAL COMBUSTION ENGINE AND A CORRESPONDING METHOD

FIELD OF THE INVENTION

The present invention relates to an exhaust gas turbocharger for an internal combustion engine and a corresponding method.

BACKGROUND INFORMATION

German Published Patent Application No. 42 13 047 describes an exhaust gas turbocharger for an internal combustion engine, the compressor of which is driven by the turbine of the charger and compresses combustion air from atmospheric pressure to a higher charge pressure during the operation of the internal combustion engine. In order to improve the transient characteristics of the exhaust gas turbocharger, compressed air can be supplied to the compressor via an additional channel, which supports in particular the increase in charger speed from low to higher peripheral speeds. This mode of operation is used in low-load ranges, where there is only a relatively small exhaust gas counterpressure which can be used to drive the charger.

The compression characteristics can be manipulated at selected operating points by supplying compressed air, which may partially compensate for a slower charge pressure buildup. This advantage, however, is obtained at the expense of a higher design and control complexity. In particular, a compressed air generating unit and a compressed air storage device, including the supply lines to the compressor and various actuating and shutoff devices are required.

It is an object of the present invention to expand the range of utilization of exhaust gas turbochargers using simple arrangements and to improve their operating characteristics.

SUMMARY

The above and other beneficial objects of the present invention are achieved by providing an exhaust gas turbocharger and method as described herein.

The exhaust gas turbocharger according to the present invention for an internal combustion engine includes a compressor with a compressor inlet channel, in which an adjustable shutoff element is arranged upstream from the compressor rotor for the variable adjustment of the effective cross-section of the compressor inlet channel. This arrangement provides the advantage that the cross-section of the compressor inlet channel may be variably adjusted, allowing the operating characteristics of the compressor to be manipulated in a targeted manner. In particular, the flow velocity and the swirl of the supplied combustion air may be manipulated. The flow inlet velocity of the supplied air may be increased, for example, by narrowing the effective cross-section. The swirl with which the combustion air impinges on the compressor rotor may also be modified by narrowing or widening the effective cross-section.

At certain operating points of the internal combustion engine, in particular at low loads or low setpoint charge pressures, the compressor may also be used as an air-driven turbine via the manipulation of the flow inlet velocity and the swirl by reducing or widening the effective cross-section in the compressor inlet channel, e.g., without reversing the direction of rotation of the compressor rotor. In a turbine operating mode of the compressor, the charge pressure to be supplied to the internal combustion engine downstream from the compressor is lower than the atmospheric pressure. Thus, there is a pressure gradient across the compressor in the direction of flow. In the low-load range too, a pressure drop across the compressor, for which the pressure at the compressor inlet is higher than at the compressor outlet, i.e., the engine cylinder inlet, may also be created. This pressure gradient across the compressor corresponds to throttling in the intake system. It generates a vacuum in the intake manifold and makes it possible to operate the internal combustion engine without a throttling valve in the intake manifold even in the low-load range. Thus, the internal combustion engine may be basically operated over the entire operating range without a throttle valve, and the intake pressure may be regulated via the compressor exclusively.

The compressor may include both a semi-axial and a radial flow inlet cross-section to the compressor rotor, it being possible to manipulate the semi-axial flow inlet cross-section via the shutoff element for variable cross-section adjustment. However, it may also be possible, if necessary, to provide an adjustable shutoff element in the radial flow inlet cross-section as an alternative or in addition to a shutoff element in the semi-axial flow inlet cross-section.

The semi-axial flow inlet cross-section may be variably adjusted between a closed position and an open position via the shutoff element, with full shutoff of this cross-section being set in the closed position, so that the entire air mass flow is supplied to the compressor rotor via the radial flow inlet cross-section. A guide grid, through which the swirl with which the supplied air impinges on the compressor rotor may be influenced, may be arranged in the radial flow inlet cross-section. This guide grid has a variable design, allowing the radial flow inlet cross-section to be variably adjusted during the operation of the internal combustion engine.

A partition, which is may be arranged in the form of a ring in the compressor inlet channel and delimits an outer annular channel through which combustion air may be supplied to the radial flow inlet cross-section, may be provided between the semi-axial and radial flow inlet cross-sections. This annular channel, arranged coaxially to the compressor rotor, allows combustion air to recirculate in certain operating ranges of the compressor in order to shift the pumping limit of the compressor toward an extended operating range of the compressor. During recirculation, a partial mass flow is supplied back into the inlet area of the compressor through the annular channel and re-aspirated together with the main flow. Thus, the pumping capacity of the compressor may be increased.

The compressor inlet channel, which may include an air filter, may be configured as an annular collection chamber, in the center of which the shutoff element is arranged, which may be annularly surrounded by the compressor inlet channel. The compressor inlet channel communicates with a compressor rotor chamber, which accommodates the compressor rotor, via a flow inlet cross-section, it being possible to adjust the effective flow inlet cross-section in the inlet area of the compressor rotor, for example, via an exclusively axial displacement of the shutoff element in the axial direction of the charger.

In the method according to the present invention, the effective cross-section in the compressor inlet channel may be variably adjusted during the operation of the internal combustion engine. This method may be combined, for example, with one or more of the previously described features.

DETAILED DESCRIPTION

In the Figures the same components are identified with the same symbols.

Figure 1:
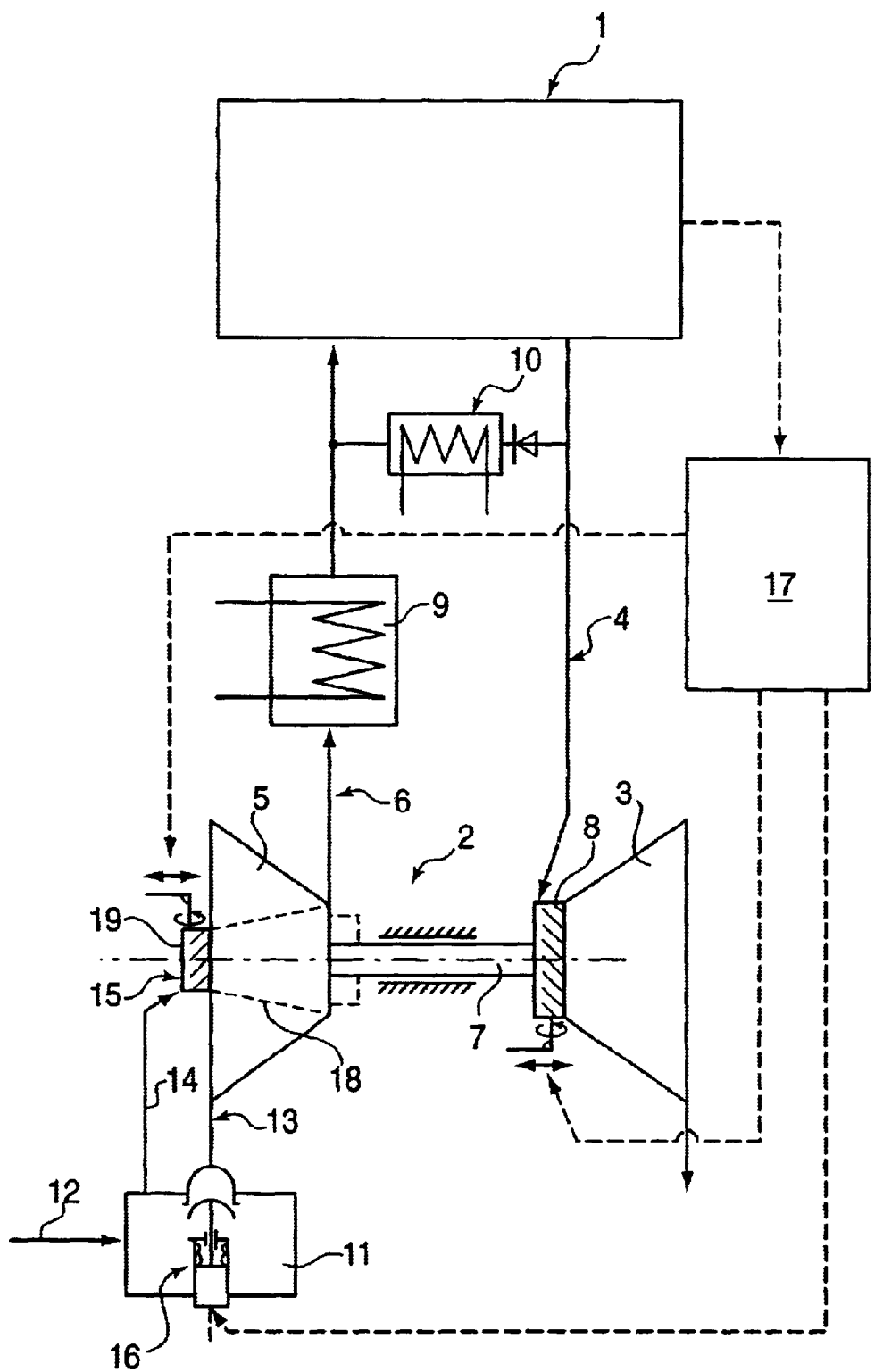
FIG. 1 is a schematic view of a charged internal combustion engine having a compressor provided with variable compressor geometry.

Internal combustion engine 1, illustrated in FIG. 1, for example, a gasoline engine or a diesel engine, includes an exhaust gas turbocharger 2 having an exhaust gas turbine 3 in exhaust gas system 4 of the internal combustion engine and a compressor 5 in intake system 6, compressor 5 being non-rotatingly connected to exhaust gas turbine 3 via a shaft 7. Turbine 3 is driven by the pressurized exhaust gases in exhaust gas system 4 and actuates via shaft 7 a compressor rotor 18, which aspirates atmospheric air at atmospheric pressure through an air inlet 12 and compresses it to a higher charge pressure. The combustion air at charge pressure downstream from compressor 5 in intake system 6 is initially cooled in a charge air cooler 9 and finally supplied to the air inlet of internal combustion engine 1.

Exhaust gas turbine 3 is provided with variable turbine geometry 8, which allows a variable adjustment of the effective flow inlet cross-section to the turbine rotor of the exhaust gas turbine during the operation of the internal combustion engine. Variable turbine geometry 8 is adjustable between an open position with a maximum supply flow cross-section and a closed position with a minimum supply flow cross-section. The variable turbine geometry may be configured as an adjustable guide grid, for example. The variable turbine geometry may be used both in the fuel-powered drive mode and in the engine brake mode.

Furthermore, exhaust gas recirculation 10 is provided between exhaust gas system 4 and intake system 6 upstream from exhaust gas turbine 3 and downstream from compressor 5 and charge air cooler 9. Exhaust gas recirculation 10 includes a connecting line between the line sections of exhaust gas system 4 and intake system 6, an adjustable shutoff valve and a cooler. In order to reduce harmful emissions and fuel consumption, in certain operating states of the internal combustion engine, exhaust gas is recirculated from gas exhaust gas system 4 into intake system 6 via exhaust gas recirculation 10.

Compressor 5 of exhaust gas turbocharger 2 may have an adjustable, variable compressor geometry 19, through which the effective flow inlet cross-section to compressor rotor 18 may be variably adjusted. Variable compressor geometry 19 may be configured, for example, as an adjustable guide grid which is arranged in a radial flow inlet cross-section to compressor rotor 18.

Compressor 5 includes a collection chamber 11, to which atmospheric air may be supplied via air inlet 12 and which communicates with compressor rotor 18 via a semi-axial flow inlet cross-section 13 as well as via a channel 14 and a radial flow inlet cross-section 15. A shutoff element 16, which may include an axially movable gate valve, via which semi-axial flow inlet cross-section 13 may be adjusted, is arranged in collection chamber 11. Shutoff element 16 acting upon semi-axial flow inlet cross-section 13 also forms a part of the variable compressor geometry of compressor 5.

Actuating signals for adjusting the actuating devices of exhaust gas recirculation system 10, exhaust gas turbine 3, and compressor 5, including shutoff element 16 in collection chamber 11 of the compressor, may be generated in a control unit 17 as a function of state quantities and operating quantities of internal combustion engine 1 and exhaust gas turbocharger 2.

In the fuel-powered drive mode of internal combustion engine 1, variable turbine geometry 8 of exhaust gas turbocharger 3 and variable compressor geometry 19 of compressor 5, including shutoff element 16 in collection chamber 11, are adjusted so that a desired charge pressure of the combustion air at the cylinder inlet of the internal combustion engine and a desired charge pressure to exhaust gas counterpressure ratio are set. In particular, when the load requirement is low, it may be appropriate to operate compressor 5 as a turbine in order to achieve a pressure drop across compressor 5 in the direction of flow, so that the charge pressure downstream from the compressor is set to a pressure that is below atmospheric pressure. At a higher load requirement, the compressor is operated in the conventional compressor mode in which a charge pressure exceeding the atmospheric pressure is generated downstream from the compressor.

The charge pressure may be set to any desired value over or below the atmospheric pressure through an appropriate operating mode of the compressor, so that in principle no additional throttling device is required downstream from the compressor.

The variable compressor geometry may also be used in the engine brake mode.

Figure 2:
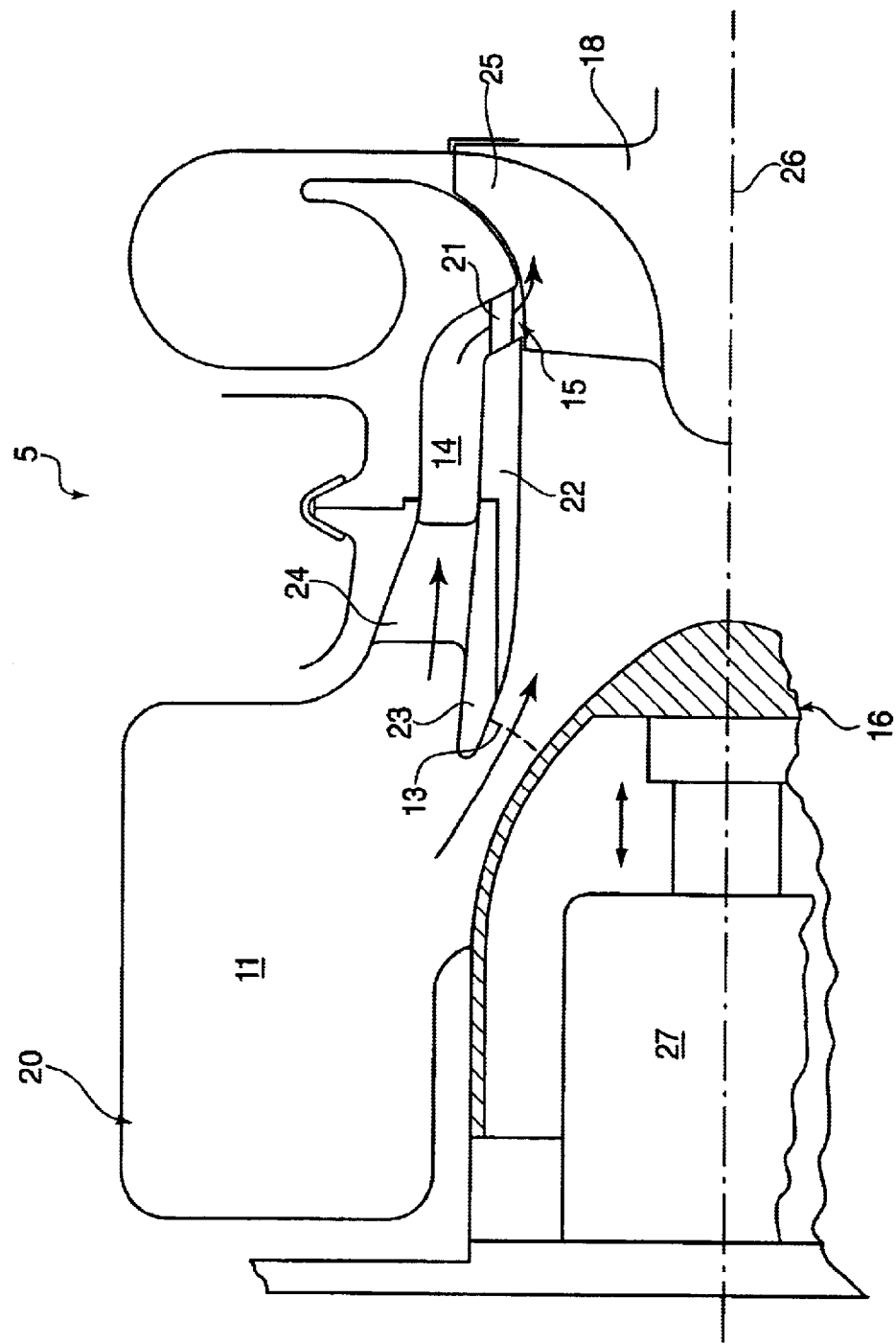
FIG. 2 is a longitudinal cross-sectional view through a compressor, the variable compressor geometry of which includes an adjustable shutoff element for variable adjustment of the effective cross-section of the compressor inlet channel.

As illustrated in FIG. 2, compressor inlet channel 20 of compressor 5 includes collection chamber 11, which is integrated in the compressor housing and communicates with a compressor rotor chamber accommodating compressor rotor 10 via both a semi-axial flow inlet cross-section 13 as well as via an annular channel 14 and a radial flow inlet cross-section 15. Annular channel 14, through which part of the combustion air contained in collection chamber 11 may be supplied to compressor rotor 18 via radial flow inlet cross-section 15, is radially separated from the chamber accommodating compressor rotor 18 by a partition 23 and a guide grid support 22. Partition 23, which is connected to the compressor housing via connecting webs 24, also delimits semi-axial supply flow cross-section 13. Guide grid support 22 is attached to partition 23 and supports guide grid 21, which in the example embodiment illustrated in FIG. 2 is configured as a fixedly adjusted guide grid, via which the swirl of the combustion air flowing via radial flow inlet cross-section 15 and impinging on compressor rotor vanes 25 may be adjusted.

Collection chamber 11 is arranged coaxially to compressor rotor axis 26 and annularly surrounds shutoff element 16, which is arranged so that it may be translationally displaced in the axial direction of compressor rotor axis 26. Shutoff element 16, the lateral surface of which may be hydrodynamically contoured, is displaced by an actuator 27 between an open position providing maximum semi-axial flow inlet cross-section and a closed position which may completely shut off semi-axial flow inlet cross-section 13. In the closed position, the lateral surface of shutoff element 16 is in sealing contact with the side of partition 23 facing it, so that the combustion air in collection chamber 11 is forced to flow exclusively through annular channel 14 and radial flow inlet cross-section 15. Shutoff element 16 is set to the closed position in particular in the low-load range, in which compressor 5 is operated as a turbine. The turbine operating mode may be assisted by a vane shape of compressor rotor vanes 25 with a curvature opposite the direction of rotation of compressor rotor 18.

With increasing load requirement, however, shutoff element 16 is displaced in the direction of its open position, so that an increasing proportion of combustion air is supplied to the compressor rotor via semi-axial flow inlet cross-section 13.

Figure 3:
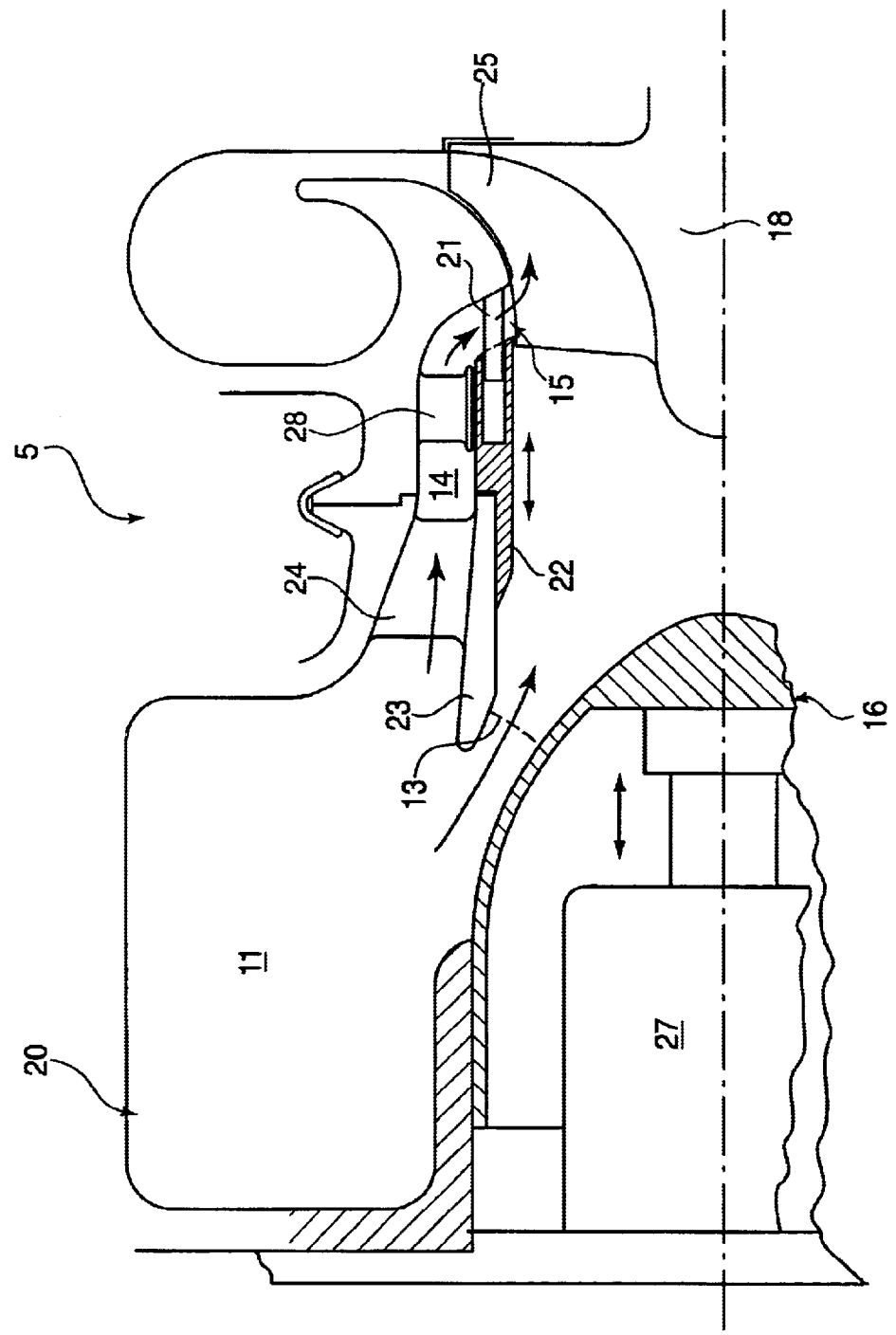
FIG. 3 is a longitudinal cross-sectional view through another example embodiment of a compressor.

The basic configuration of the compressor illustrated in FIG. 3 corresponds to that illustrated in FIG. 2, but with the difference that radial flow inlet cross-section 15 to compressor rotor 18 may be variably adjusted. Guide grid 21, which is supported by guide grid support 22, which in the example embodiment illustrated is guided in an axially displaceable manner on a housing-side support 28, is located in radial flow inlet cross-section 16. Guide grid support 22 includes an opening, into which stationary guide grid 21, located in the housing, may be introduced when guide grid support 22 is displaced, whereby free radial flow inlet cross-section 15 may be reduced.

According to an alternative example embodiment of the present invention, guide grid support may also be attached stationarily, and the guide grid may be configured to be variable in the radial flow inlet cross-section, for example, by equipping it with swiveling guide vanes.

Figure 4:
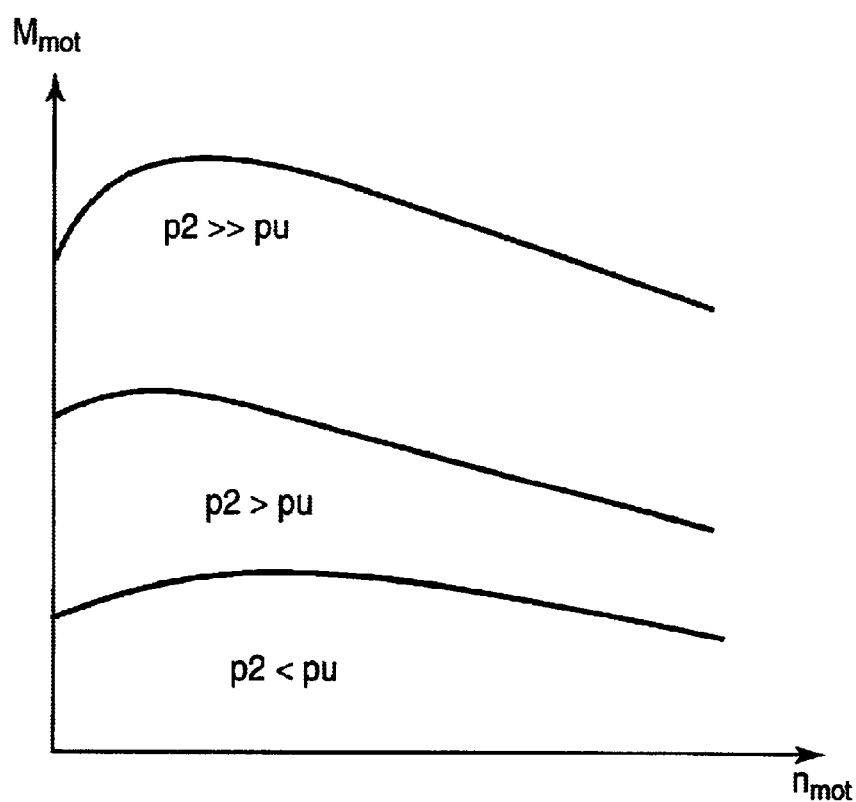
FIG. 4 is an engine torque/engine speed diagram in which one range with a pressure drop and two ranges with a pressure increase across the compressor are plotted.

As illustrated in FIG. 4, three different ranges of engine torque $M_{Mot}$ are plotted against engine speed $n_{Mot}$.

In a lower load range, which is associated with a low engine torque $M_{Mot}$, charge pressure $p_2$ is less than atmospheric pressure $p_u$. In this range, the compressor is operated as a turbine, whereby a low pressure may be produced at the outlet side of the compressor in the combustion air to be supplied to the cylinder inlets. The exact charge pressure to be set may be regulated via the variable compressor geometry, in particular via the axial displacement of the shutoff element in the compressor.

In a medium range, which is associated with a medium engine torque $M_{Mot}$, charge pressure $p_2$ is greater than atmospheric pressure $p_u$. The compressor is operated in the conventional manner and produces compression of the aspirated atmospheric air. In this range, air may be regulated via the swirl of the combustion air supplied to the compressor rotor, in particular by adjusting the variable compressor geometry, the axially displaceable shutoff element being actuated.

In the third, uppermost load range, which is associated with a high engine torque $M_{Mot}$, charge pressure $p_2$ is considerably higher than atmospheric pressure $p_u$. In this range the compressor is also operated in the conventional mode. The charge pressure may be regulated by adjusting the variable turbine geometry of the exhaust gas turbine.

What is claimed is:

1. An exhaust gas turbocharger for an internal combustion engine, comprising:
    an exhaust gas turbine configured to be arranged in an exhaust gas system of the internal combustion engine;
    a compressor configured to be arranged in an intake system of the internal combustion engine and configured to produce compressed charge air, the compressor including a compressor inlet channel and a compressor rotor positioned in the compressor inlet channel; and
    an adjustable shutoff element arranged in the compressor inlet channel upstream from the compressor rotor, the adjustable shutoff element being configured to variably adjust an effective cross-section of the compressor inlet channel.

2. The exhaust gas turbocharger according to claim 1, wherein the shutoff element includes an axially movable gate valve.

3. The exhaust gas turbocharger according to claim 1, wherein the shutoff element is configured to completely close the cross-section of the compressor inlet channel.

4. An exhaust gas turbocharger for an internal combustion engine, comprising:
    an exhaust gas turbine configured to be arranged in an exhaust gas system of the internal combustion engine;
    a compressor configured to be arranged in an intake system of the internal combustion engine and configured to produce compressed charge air, the compressor including a compressor inlet channel and a compressor rotor positioned in the compressor inlet channel; and
    an adjustable shutoff element arranged in the compressor inlet channel upstream from the compressor rotor, the adjustable shutoff element being configured to variably adjust an effective cross-section of the compressor inlet channel, wherein the compressor includes a semi-axial flow inlet cross-section and a radial flow inlet cross-section to the compressor rotor.

5. The exhaust gas turbocharger according to claim 4, wherein the shutoff element is configured to adjust the semi-axial flow inlet cross-section.

6. The exhaust gas turbocharger according to claim 4, further comprising a guide grid arranged in the radial flow inlet cross-section.

7. The exhaust gas turbocharger according to claim 4, further comprising a partition arranged between the semi-axial flow inlet cross-section and the radial flow inlet cross-section.

8. An exhaust gas turbocharger for an internal combustion engine, comprising:
    an exhaust gas turbine configured to be arranged in an exhaust gas system of the internal combustion engine;
    a compressor configured to be arranged in an intake system of the internal combustion engine and configured to produce compressed charge air, the compressor including a compressor inlet channel and a compressor rotor positioned in the compressor inlet channel; and
    an adjustable shutoff element arranged in the compressor inlet channel upstream from the compressor rotor, the adjustable shutoff element being configured to variably adjust an effective cross-section of the compressor inlet channel, wherein the compressor inlet channel includes an annular collection chamber.

9. The exhaust gas turbocharger according to claim 8, wherein the collection chamber annularly surrounds the shutoff element.

10. The exhaust gas turbocharger according to claim 8, further comprising an air filter arranged in the collection chamber.

11. A method of operating an exhaust gas turbocharger for an internal combustion engine, comprising the steps of:
    influencing a charge pressure as a function of one of state quantities and operating quantities of at least one of the exhaust gas turbocharger and the internal combustion engine; and variably adjusting an effective cross-section in a compressor inlet channel during operation of the internal combustion engine.

12. The method according to claim 11, wherein the exhaust gas turbocharger includes:

an exhaust gas turbine configured to be arranged in an exhaust gas system of the internal combustion engine;

a compressor configured to be arranged in an intake system of the internal combustion engine and configured to produce compressed charge air, the compressor including the compressor inlet channel and a compressor rotor positioned in the compressor inlet channel; and an adjustable shutoff element arranged in the compressor inlet channel upstream from the compressor rotor, the adjustable shutoff element being configured to variably adjust the effective cross-section of the compressor inlet channel.

13. The method according to claim 11, wherein the variably adjusting step includes the substeps of:

narrowing the effective cross-section for a turbine operation mode of a compressor in a low load range; and widening the effective cross-section with an increasing load.

14. A method of operating an exhaust gas turbocharger for an internal combustion engine, comprising the steps of:

influencing a charge pressure as a function of one of state quantities and operating quantities of at least one of the exhaust gas turbocharger and the internal combustion engine;

variably adjusting an effective cross-section in a compressor inlet channel during operation of the internal combustion engine; and setting at least one of a semi-axial flow inlet cross-section and a radial flow inlet cross-section in the compressor inlet channel and a flow inlet cross-section in a turbine in an area of variable turbine geometry so that a charge speed at a high level has a small fluctuation amplitude in a broad operating range of an engine operation.

\* \* \* \* \*